J. A. CHAMPIE.
PIPE OR ROD GRIP.
APPLICATION FILED JAN. 4, 1916.
1,216,943.
Patented Feb. 20, 1917.
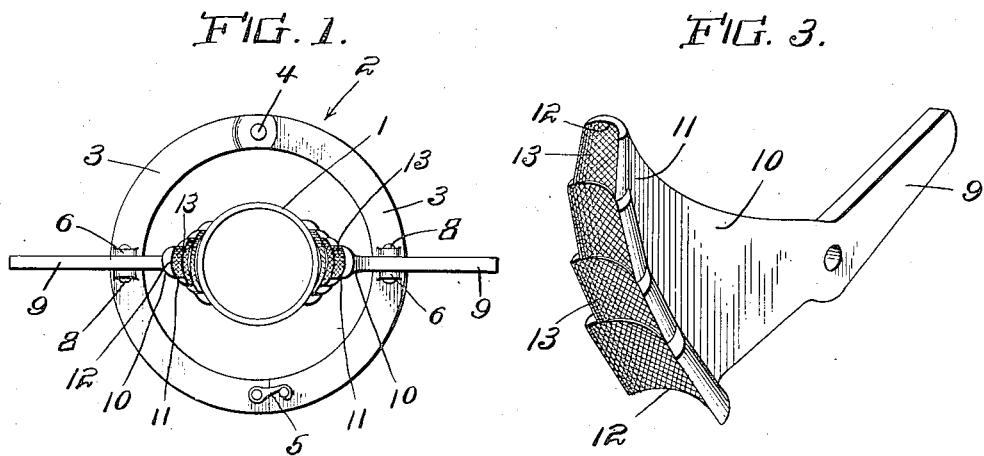
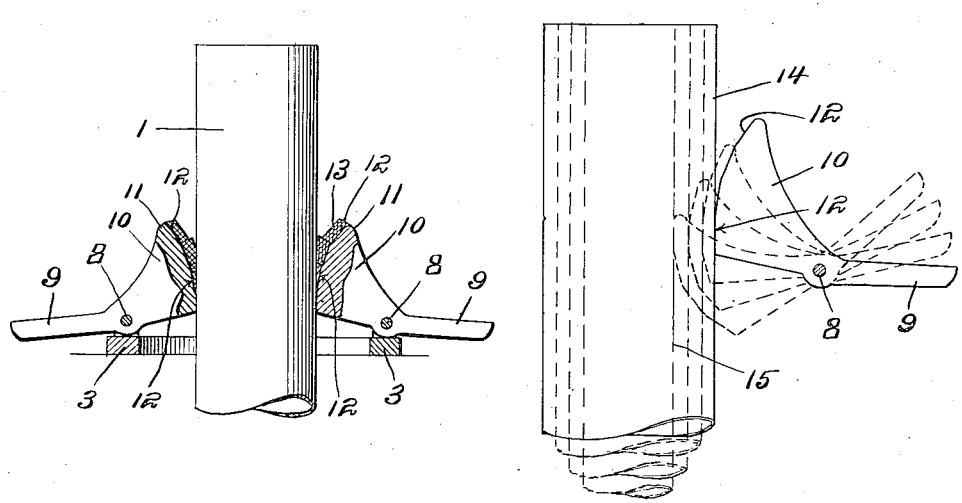
Inventor
J. A. Champie
Witness
A. C. Newkirk
By Victor J. Evans
Attorney

UNITED STATES PATENT OFFICE.

JAMES A. CHAMPIE, OF EDEN, TEXAS.

PIPE OR ROD GRIP.

1,216,943.    Specification of Letters Patent.    Patented Feb. 20, 1917.

Application filed January 4, 1916. Serial No. 70,262.

*To all whom it may concern:*

Be it known that I, JAMES A. CHAMPIE, a citizen of the United States, residing at Eden, in the county of Concho and State of Texas, have invented new and useful Improvements in Pipe or Rod Grips, of which the following is a specification.

This invention relates to improvements in pipe or rod clamps or grips and has particular reference to an automatic clamp or grip.

In carrying out my invention it is my purpose to provide a clamp or grip whereby in the drawing or raising of the tubes or rods of Artesian or oil well pumps, such tubes or rods will be effectively gripped and held in a desired elevated position so that a fresh grip may be obtained upon the tube or rod to complete the drawing or pulling thereof.

It is also my purpose to provide a tube or rod grip of the class described which may be employed for rotating the tube or rod and which has its jaws arcuate or incurved at less than a half a circle and grooved longitudinally to provide each of the jaws with a plurality of engaging faces of gradually decreasing circumference whereby said faces may be employed for pipes of different sizes and further whereby the liability of the breakage of the teeth of the jaws or of the jaws themselves incident to the same engaging pipes of varying diameters will be effectively decreased, if not entirely obviated.

It is a still further object of the invention to provide a tube or pipe grip of this class which will embrace the desired features of efficiency, simplicity and strength coupled with cheapness in manufacture and which will be automatic in its action.

With the above and other objects in view, the improvement resides in the construction, combination and arrangement of parts set forth in the following specification and falling within the scope of the appended claim.

In the drawing:

Figure 1 is a plan view illustrating the application of my improvement,

Fig. 2 is a longitudinal sectional view through the same approximately on the line 2—2 of Fig. 1, Fig. 3 is a perspective view of one of the jaw members, Fig. 4 is a diagrammatic view illustrating the manner in which the several faces of the jaw engage with varying diameters of pipes or rods.

In the drawing, 1 designates the pump rod of an Artesian or oil well. 2 designates my improved clamp or grip as an entirety, such grip comprising a ring like member formed of two sections 3—3, pivotally connected one to the other through the medium of a pivot pin 4 and having their free ends overlapping and connected in any suitable manner, as indicated by the numeral 5. The sections 3—3 constituting the ring-like members when in service are adapted to encircle the rod or tube of the pump as illustrated in the drawing, the said ring intermediate of the pivot and the connected ends of the sections comprising the same are provided upon their upper faces with spaced ears 6 arranged in pairs and each pair being adapted to be received between the same and have pivotally secured thereto, as at 8, the handle portions 9 of clamp members 10. The clamps each include a substantially elongated head 11 which has its engaging face concaved and stepped or reduced longitudinally at spaced intervals to provide any desired number of engaging faces 12—12 and each of the said faces is serrated or provided with teeth 13—13. The concaved faces are less than a half circle and the face of each of the heads which is adapted to engage with the largest pipe 14, is of a greater width than the adjacent faces, the width of the said faces decreasing to that which engages with the smallest pipe 15.

The weighted heads, of course, swing the gripping members upon their pivots so as to bring the same into automatic engagement with the pipes, and in Fig. 4 of the drawings there is shown diagrammatically the various positions of one of the gripping members when engaging pipes of varying cross sectional diameters.

Should it be further desirable to employ the device as a wrench for rotating the pipes, it will be merely necessary to grasp the handle 9 of each of the gripping elements outward of its pivot 8 to force the gripping face of the same against the pipe and to rotate the device as a unit.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a device for the purpose set forth, a ring member providing a base, said base comprising two sections which are pivotally secured, means for connecting the meeting ends of the sections, each of said sections, approximately centrally between its pivot and its free end having upturned ears, a clamp pivoted to said ears, each of said clamps including a handle member having one of its ends offset to provide an elongated head which has its outer face concaved and stepped longitudinally to provide a plurality of engaging faces, each of said faces being serrated, and each of said faces being successively reduced in width.

In testimony whereof I affix my signature, in presence of two witnesses.

JAMES A. CHAMPIE.

Witnesses:
CHAS. L. KING,
VERNON A. HUMPHREYS.